United States Patent Office 3,210,802
Patented Oct. 12, 1965

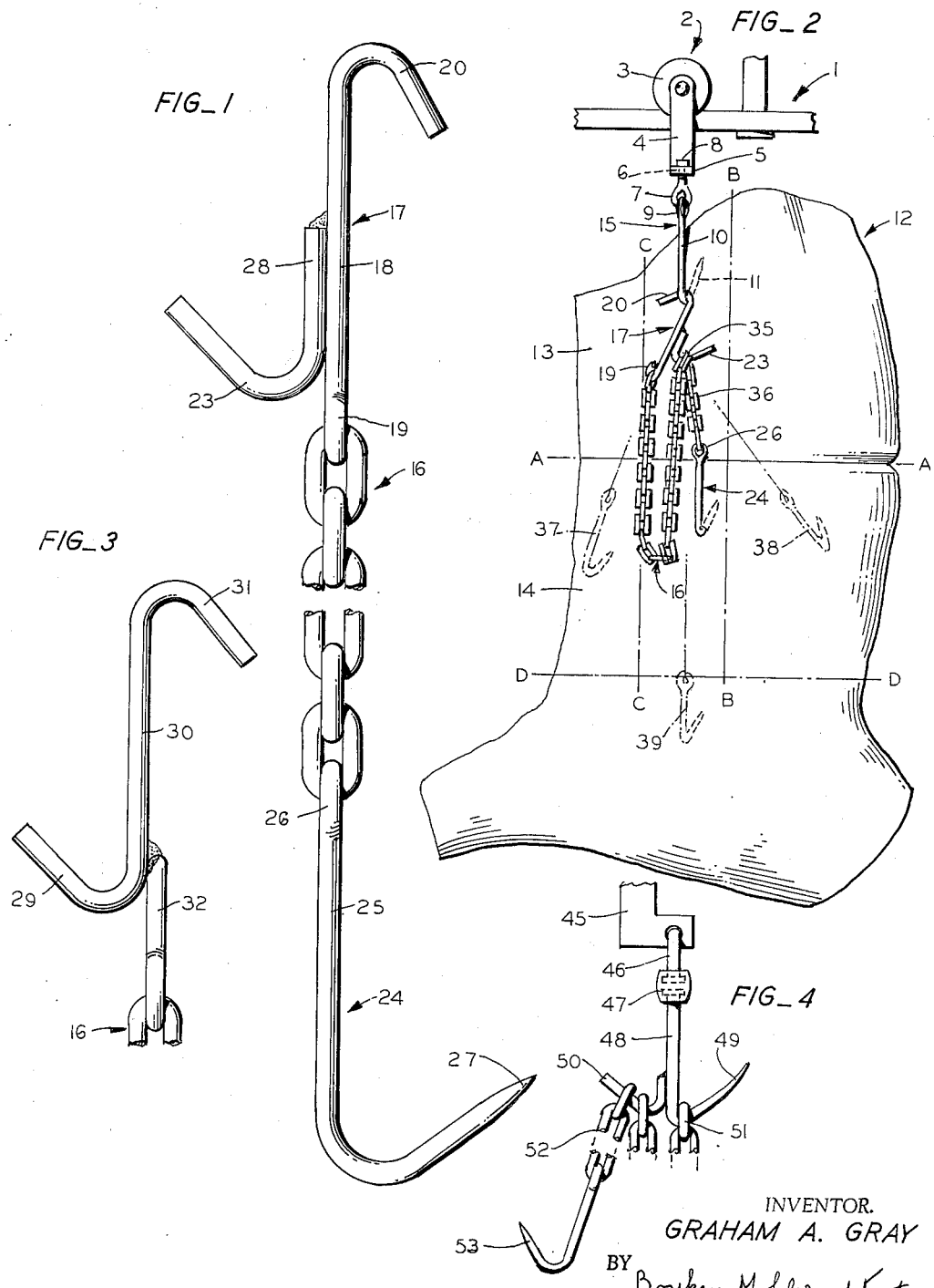

3,210,802
METHOD OF SEVERING A SECTION OF MEAT FROM A LARGE SUSPENDED BODY THEREOF
Graham A. Gray, 234 G St., Davis, Calif.
Filed Feb. 19, 1964, Ser. No. 345,918
2 Claims. (Cl. 17—45)

This invention relates to the operation of dividing a relatively large body of meat into fractional portions.

In the meat industry beef, lamb etc. are normally handled in halves, quarters etc. and in most instances are suspended from one end from a hook, that, in turn, depends from a trolley that is on an overhead rail. Whether or not the overhead trolley is used, the body of meat is suspended from an overhead hook that is impaled in the body adjacent to its uppermost end or otherwise connected to the uppermost end.

Assuming a forequarter of beef is to be divided, the head end is usually lowermost with the prime ribs in the upper section, hence, one customary step is to generally horizontally divide the quarter just below the prime rib section to separate it from the chuck that is therebelow. This remainder or chuck may weigh from one hundred pounds up to several hundred pounds, which has heretofore made it necessary for the butcher to hold the lower section to prevent its falling to the floor when severed from the upper section, if the separation is made when the quarter is suspended, and thereafter the lower section is hoisted to be impaled on and suspended from another overhead hook similar to the one from which the upper section of the body is suspended, or the quarter is lifted from the hook and laid on the table, and the divided sections again hoisted to hooks.

In a procedure such as above described, it is apparent that the butcher must have the assistance of another person where the lower section is severed from a suspended quarter, and where its weight is great, or where the quarter must be lifted onto a table for cutting, and re-hoisted to a hook or hooks.

In any event, the strain on the person or persons handling the meat is substantial, particularly where one person attempts to hold the section severed from the suspended quarter or half, and this strain frequently results in serious and painful back injury. Also, there are many instances in which the severed section has accidentally fallen to the floor, and has become contaminated, with the possible injury to the user of the meat.

The present invention provides a method for entirely overcoming the above difficulties, and one of the objects of the invention is the provision of a simple method that will enable a butcher to completely sever a suspended body of meat of any size from a whole carcass to any fraction thereof without danger of the severed section falling to the floor and without the slightest strain on the butcher in attempting to support the severed section upon its severance from the remainder of the body, or in lifting the body of meat from the hook and re-hoisting them both back onto hooks after severance.

Another object of the invention is the provision of an improved method of dividing a body of meat while it is suspended from a point adjacent to its upper end.

A still further object of the invention is the provision of a method whereby a body of meat suspended from its upper section may be divided vertically or horizontally, without changing the point of suspension, and in which the weight of the severed section or sections of meat is transferred to said point as each is being severed.

Other objects and advantages will appear in the description and drawings.

In the drawings, FIG. 1 is a side elevational view of a device for carrying out the method, broken in length to accommodate the view to the sheet.

FIG. 2 is a reduced size side elevational view of the device when in use, and several broken line positions of the device are indicated to illustrate a few of the many different positions of the device of FIG. 1 or of several such devices according to how the body of meat is to be divided.

FIG. 3 illustrates a slight modification of a portion of the device of FIG. 1.

FIG. 4 is a further modification of the device shown in FIGS. 1–3.

In detail, referring to FIG. 2, an overhead track or rail is generally indicated at 1, which track may support one or any desired number of trolleys 2 thereon for movement longitudinally of the track 1.

The track and trolley are conventional, the trolley comprising a wheel 3 formed with an outwardly opening groove in its outer periphery that receives the upper edge of track 1. A hanger 4 may depend from the axle of wheel 3, which hanger has a laterally projecting, vertically apertured projection 5 through which the upwardly projecting shank 6 on an eye 7 rotatably projects. A head 8 on the upper end of said shank is supported on said projection 5. Thus said eye 7 and anything suspended therefrom may swivel about the vertical axis of the shank.

An eye 9 on the upper end of the vertical shank 10 of a pointed meat impaling hook 11 is held in eye 7 that is suspended from hanger 4. This meat hook, as a whole, including the shank 10 and eye 9, is generally designated 15.

All of the above structure, in one form or another, is old and is used in packing plants, butcher shops, restaurants etc. wherever the quarters, halves etc. of meat are hung. The hook 11 suspended from each hanger 4 is normally impaled in the upper section of the body of meat 12, particularly where such body is a quarter of beef or the like. In the case of lamb or pork, a side may be suspended and the desired divisions made to separate the same along one or more of the lines defining the junctures between the various parts, such as the shoulder and rack, or rack and loin, etc.

As heretofore mentioned, it is common practice for the forequarter of beef to be divided generally along line A—A, so that the upper section that includes the prime ribs and plate, designated 13, may be separated from the chuck, or lower section 14.

The device illustrated in FIG. 1 comprises a conventional chain 16, which is preferably approximately three feet in length, and of sufficient strength to take the weight of the largest section that is to be divided from the portion that is suspended from the hook 11, with preferably an adequate margin of safety. It is not intended, however, that the invention be restricted to the length specified above.

Inasmuch as the chain 16 normally is suspended from one end when in use, such end will be called the upper end while the opposite end will be called the lower end.

Secured to the upper end of the chain 16 is a special hook device generally designated 17. This hook device comprises an elongated shank 18 that has an eye 19 formed on its lower end, and the upper link of chain 16 may be held by this eye 19. A downwardly directed hook 20 is formed on the upper end of shank 18.

The eye 19, shank 18 and hook 20 may correspond to eye 7, shank 10 and hook 11 of the meat hook, except that the hook 20 of the hook device 17 is uppermost and the hook 20 is not pointed, but is blunt, and the hook device 17 has an upwardly directed hook 23 rigid therewith at a point just above eye 19 and projecting to the side of shank 18 opposite to the side from which hook 20 projects.

Secured to the lower end of the chain 16 is a conventional meat hook generally designated 24 which may be identical to the meat hook 15, having a shank 25 with an eye 26 at one end and a pointed, meat impaling, upwardly directed hook 27 at its opposite end. The lower link of chain 16 is secured to eye 26.

In FIG. 1 the hook 23 is slim with a shank 28 that is welded to shank 18, while in FIG. 3 a hook 29 at the lower end of the shank 30 is in continuation of shank 30, as is the hook 31 at the upper end of shank 30, and an eye 32 is welded to the lower end of shank 30 instead of being formed from shank 30.

In shape, size and function, the hooks 29, 31 and shank 30 and eye 32 correspond to hooks 23, 20 and shank 18 and eye 19 of the device shown in FIG. 1. Obviously, there may be other variations in the way the hook device is made, but preferably, in each instance, it includes a pair of oppositely directed hooks, neither of which is pointed at the outer end, and the hook at the lower end of the device is directed generally upwardly, and the device is connected to the upper end of a chain.

Referring to FIG. 2 for the manner of operation of the device, assuming the illustrated forequarter of beef is first to be divided horizontally along line A—A, the hook 20 of the device 17 is hooked to the main meat hook 15, normally engaging the latter adjacent to the bend that connects the shank with the meat impaling hook 11.

The pointed meat impaling hook 27 of the device 17 is then impaled in the upper part of the chuck, or lower section 14 of the body 12 adjacent to line A—A.

After the above steps (and either the impaling step or the step of connecting hook 20 to hook 15 may be performed first) the length of the chain 16 between the eye 19 (FIGS. 1, 2) (or eye 32, FIG. 2) and the hook 24 will be quite slack. The slack of chain 16 extending from the hook 24 for a distance substantially equal to the distance from eye 26 on hook 24 to the hook 23 on the hook device 17 is taken up and the link 35 at said distance is slipped over hook 23. That is, the hook 23 extends through the central opening in the link. The portion of the chain between said link 35 and the hook 24 is indicated at 36. Thus the length 36 of chain 16 is relatively taut.

After the above-described step, it merely remains for the butcher to sever the chuck or lower section 14 of body 12 from the upper section 13 thereof generally along line A—A, and as this step is performed, the weight of the lower section will progressively be taken by the portion 36 of the chain and hook 15, and when the severance is completed, the entire weight of the chuck, or section 14, will be taken by hook 15 and the portion 36 of the chain, and said section 14 will be suspended in approximately the same level relative to section 13 of the body of meat, as prior to severance. Normally the section 14 will be separated slightly from the section 13, which is desirable.

If desired, the two sections 13, 14 of the body 12 may remain suspended from the same hook 15, and parts cut from each, or the upper section 13 may be transferred to another hook 15 on another trolley, or the lower section 14 may later be transferred to another hook 15. In any event, there is no necessity for more than one person to be occupied in dividing the body 12 of meat no matter how great the weight of the section that is to be engaged, and during this severance operation the operator or butcher at no time must support any of the meat. There is no danger of the lower section of the meat falling to the floor and becoming contaminated, and if it is found desirable to transfer the lower section 13 to another hook 15, the operator has both hands free to do so.

Again referring to FIG. 2, it is pertinent to note that any number of the devices of FIG. 1 may be connected to the same hook 15 and extended to different portions of the body 12. The broken line positions 37, 38 of the hook 27 represent the hooks of a pair of the devices which may be used if it is desired to cut the body vertically along line B—B or C—C. The hook 27 on one device may be connected at either 37 or 38 if only one vertical cut along either B—B or C—C is desired, or a hook 27 at position 39 may be used where a horizontal division is made along line D—D lower down on the body 12 than line A—A. The fact that a chain with open links connects the hook 24 with the hook device 17 enables any desired adjustment of the length that is to take the weight of the severed portion inasmuch as any of the hooks will pass through the central opening in any of said links.

It is understood that the lines A—A, B—B etc. are merely illustrative of the fact that the body 12 can be divided into as many sections as desired at any point on the body 12, and should the operator wish the severed section to drop away from the section that is engaged by hook 15 to a greater or lesser degree, the desired result can be accomplished by increasing or decreasing the slack of the portion 36 of the chain when connecting the link with hook 23.

Virtually, a carcass, side or quarter may be entirely divided into any desired number of sections without manually holding any of the sections during cutting, by merely connecting the section to be cut from the body or from any section thereof with the main hook 15 as above described.

From the foregoing it may be said that this invention comprises a method of dividing a body of meat by suspending the entire weight of said body from a hook impaled in the body adjacent to the upper end of said body and then progressively cutting from said body the portion or section to be severed therefrom and at the same time progressively supporting the weight of said section, as it is severed from the body, by said hook for suspension directly therefrom, with said portion so severed remaining in generally the same level after severance as before.

FIG. 4 shows a further modification of the invention in that trolley wheel 3 of FIG. 1 may have a conventional form of hanger 45 suspended therefrom that includes an eye 46 connected by a swivel coupling 47 with the shank 48 of the main meat hook 49. This meat hook corresponds to the hook 15 of FIG. 2, except that it may carry the auxiliary blunt ended hook 50 which corresponds in shape and position to the hook 23 and 29 of FIG. 1 and FIG. 2.

By this structure before the meat hook 49 is in a body 12 (FIG. 2) of meat, the upper link 51 of a chain 52, corresponding to chain 16, may be slipped over the hook 49 instead of the hook device 17 of FIG. 1. The cutting operation will then proceed as described for FIGS. 1–3, since chain 52 carries a hook 53 at the end thereof opposite to link 51.

The invention is not to be limited by the exact embodiment of the device shown, since various other forms of the device will be apparent to those skilled in the art without departing from the spirit of the invention or the scope of the claims.

I claim:

1. The method of dividing a body of meat that comprises the steps of:
   (a) suspending the entire weight of said body a substantial distance above a floor from a meat hook impaled in said body adjacent to the upper end of the latter, then
   (b) progressively severing a section of said body that is spaced from said hook to complete severance from said body and at substantially the same time and upon said severance
   (c) supporting the weight of the section as progressively severed and immediately upon complete severance, by said hook for suspension of said section directly from said hook; and (d) maintaining said section at generally the same level and in substantially the same position relative to said hook after said severance from said body as before said severance.

2. In the method of dividing a body of meat that is suspended in a position spaced above a floor from a meat hook impaled in the upper portion of said body adjacent to the upper end of the latter, the steps of:
   (a) progressively severing from said body, to complete severance therefrom different sections thereof along different lines spaced from said hook;
   (b) during the severing of each different section, and immediately upon said complete severance supporting the weight of each such section from said hook against falling, whereby each such section will automatically be suspended from said hook at one point only and at approximately the same position relative to said one point as prior to said severance.

References Cited by the Examiner

UNITED STATES PATENTS

| | | |
|---|---|---|
| 697,197 | 4/02 | Clark. |
| 838,826 | 12/06 | Walls. |
| 1,189,966 | 7/16 | Kellogg _____ 17—44 |
| 1,713,835 | 5/29 | Krieg. |
| 1,719,030 | 7/29 | Smith _____ 17—45 |
| 2,044,841 | 6/36 | Fredberg et al. _____ 17—45 X |
| 2,551,155 | 5/51 | Orling _____ 17—24 X |
| 2,882,551 | 4/59 | Reich _____ 17—24 |

FOREIGN PATENTS

| | | |
|---|---|---|
| 10,693 | 1896 | Great Britain. |
| 23,386 | 1910 | Great Britain. |

SAMUEL KOREN, *Primary Examiner.*

LUCIE H. LAUDENSLAGER, *Examiner.*